United States Patent [19]

De Jong

[11] Patent Number: 5,197,373

[45] Date of Patent: Mar. 30, 1993

[54] APPARATUS FOR PREPARING BEVERAGES, SUCH AS COFFEE OR TEA, BY EXTRACTION

[75] Inventor: Adam De Jong, Ottoland, Netherlands

[73] Assignee: J. M. De Jong Duke Automatenfabriek B.V., Sliedrecht, Netherlands

[21] Appl. No.: 793,449

[22] PCT Filed: Jul. 25, 1990

[86] PCT No.: PCT/NL90/00103

§ 371 Date: Jan. 14, 1992

§ 102(e) Date: Jan. 14, 1992

[87] PCT Pub. No.: WO91/01673

PCT Pub. Date: Feb. 21, 1991

[30] Foreign Application Priority Data

Jul. 28, 1989 [NL] Netherlands ................. 8901968

[51] Int. Cl.$^5$ ............................................ A47J 31/32
[52] U.S. Cl. ................... 99/283; 99/289 R; 99/289 T; 99/287; 99/302 R
[58] Field of Search ................. 99/280-283, 99/289 R, 289 T, 299, 300, 302 R, 304-306, 316, 287; 426/433

[56] References Cited

U.S. PATENT DOCUMENTS

| | | | |
|---|---|---|---|
| 1,376,287 | 4/1921 | Meyfarth | 99/305 |
| 3,338,153 | 8/1967 | Holstein et al. | 99/289 R |
| 3,446,137 | 5/1969 | Pryor et al. | 99/289 R |
| 3,565,641 | 2/1971 | King | 99/287 |
| 3,666,558 | 5/1972 | Pryor et al. | 99/287 |
| 3,921,665 | 11/1975 | Lebzelter | |

FOREIGN PATENT DOCUMENTS

| | | | |
|---|---|---|---|
| 87922 | 4/1922 | Austria | 99/302 R |
| 2043803 | 4/1972 | Fed. Rep. of Germany | |
| 3019347 | 12/1981 | Fed. Rep. of Germany | |
| 6806368 | 11/1968 | Netherlands | |
| 1318865 | 5/1973 | United Kingdom | 99/289 R |
| 2178645 | 2/1987 | United Kingdom | |
| WO85/04561 | 10/1985 | World Int. Prop. O. | |
| WO86/05670 | 10/1986 | World Int. Prop. O. | |
| WO88/02612 | 4/1988 | World Int. Prop. O. | |

Primary Examiner—Harvey C. Hornsby
Assistant Examiner—Mark Spisich
Attorney, Agent, or Firm—Young & Thompson

[57] ABSTRACT

Apparatus for preparing beverages such as coffee or tea, comprising a filter unit (3), and extraction chamber (1) positioned above the filter unit, and a reception chamber (2) positioned underneath the filter unit, which reception chamber at the bottom part thereof comprises a discharge channel (9) for discharging the prepared beverage. The apparatus comprises furthermore reservoirs for supplying coffee or tea powder (7) and hot water (6) in the extraction chamber to prepare an extract during a predetermined extraction period, and a control unit (13) controlling the various components such that after activating said reservoirs for supplying predetermined amounts of hot water and coffee or tea powder in the extraction chamber (1), an extraction period is measured during which the extraction porcess is completed, after which the pump (11) unit is activated to suction the prepared extract through the filter paper web (3). The pump unit (11) is double acting and is connected through suitable piping (12) to the side wall of the reception chamber (2) at a level above the maximum fluid level in said reception chamber. A discharge valve (10) is installed in the bottom of the reception chamber (2) or in the discharge channel (9). The control unit (13) is embodied such that during the extraction period the discharge valve (10) will be closed and the pump unit (11) will be activated to press air into the reception chamber (2) causing such an overpressure that an air stream is created through the filter unit (3) and through the mixture of water and coffee or tea powder agitating said mixture and that at the end of the extraction period, still with closed discharge valve (10), the action of the pump (11) unit is reversed to suction air from the reception chamber (2) causing such an underpressure that the prepared extract will be suctioned through the filter unit (3) into the reception chamber (2).

6 Claims, 4 Drawing Sheets

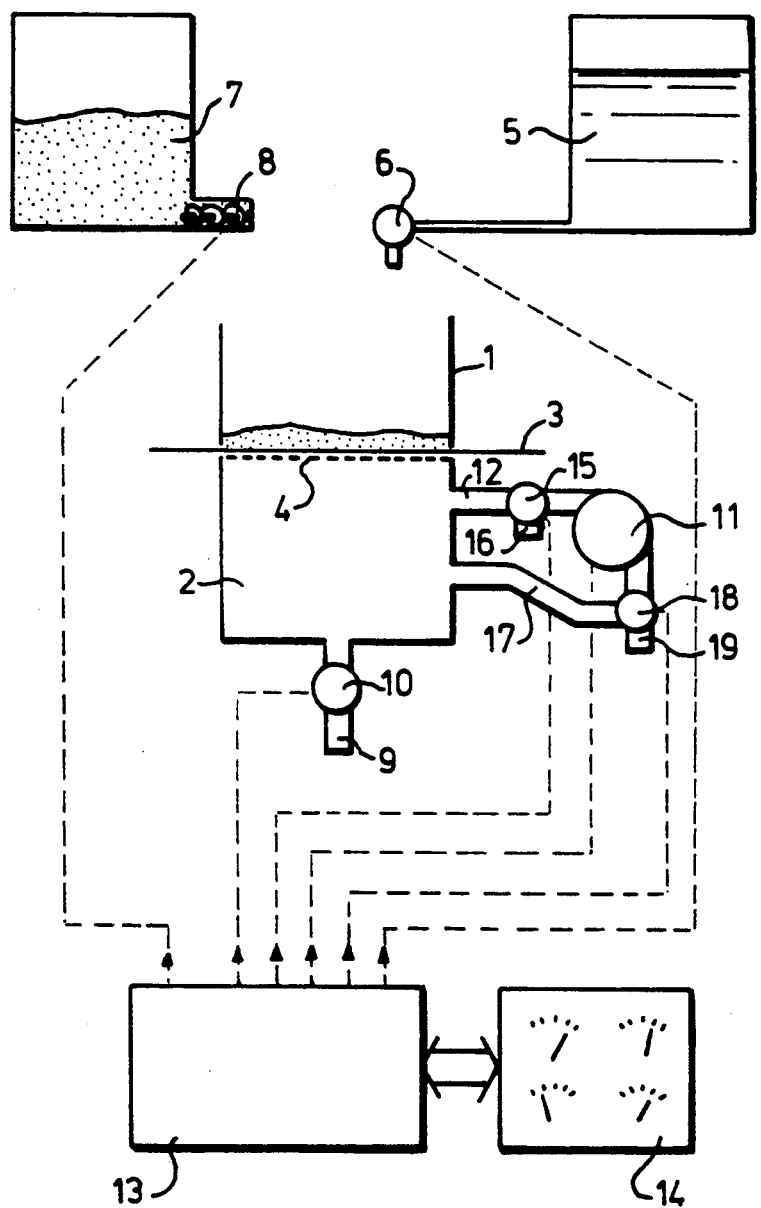

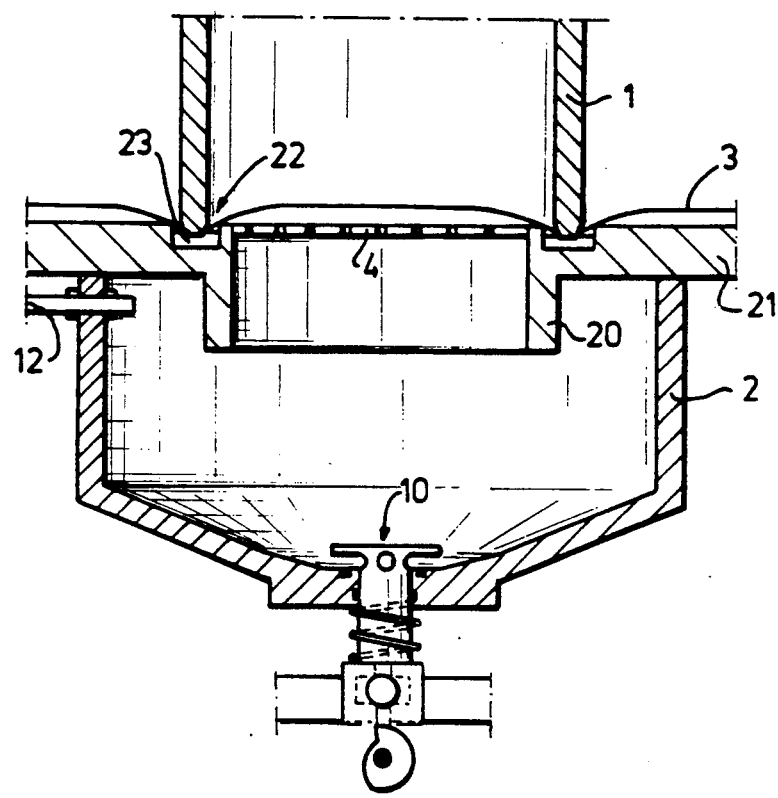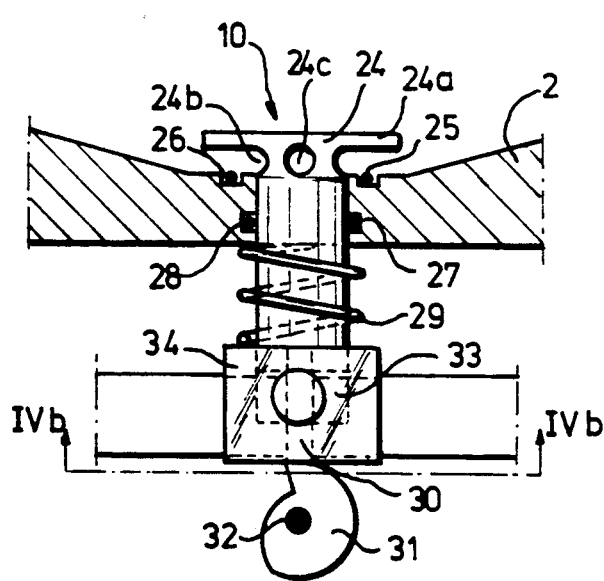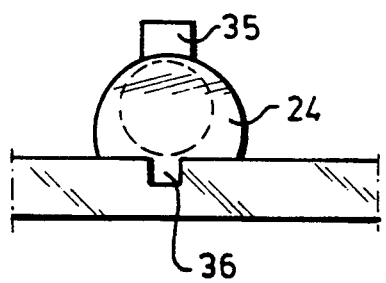

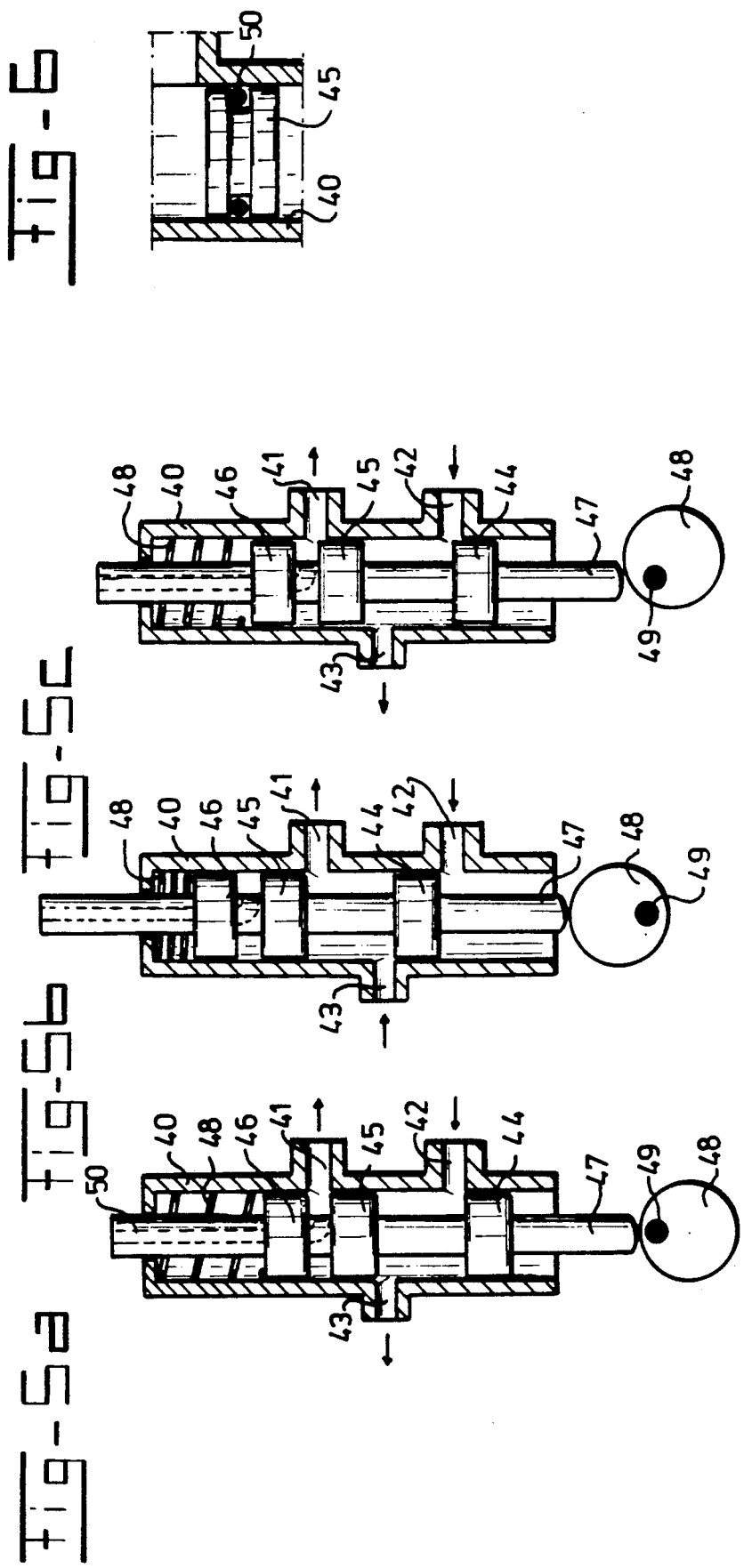

APPARATUS FOR PREPARING BEVERAGES, SUCH AS COFFEE OR TEA, BY EXTRACTION

FIELD OF THE INVENTION

The invention relates to an apparatus for preparing beverages such as coffee or tea, comprising:
a filter unit,
an extraction chamber positioned above said filter unit, the bottom wall of said extraction chamber being at least partly permeable, which at least partly permeable bottom of the extraction chamber can be pressed against the filter unit by suitable means,
a reception chamber positioned underneath the filter unit, the upper wall of said reception chamber being at least partly permeable and positioned in contact with the filter unit, which reception chamber at the bottom part thereof comprises a discharge channel for discharging the prepared beverage,
means for supplying coffee or tea powder and hot water in the extraction chamber to prepare an extract during a predetermined extraction period,
a pump unit for suctioning the prepared extract through the filter unit in the reception chamber, and
a control unit controlling the various components such that after activating said means for supplying predetermined amounts of hot water and coffee or tea powder in the extraction chamber an extraction period is measured during which the extraction process is completed, after which the pump is activated to suction the prepared extract through the filter paper web.

An apparatus of this type is described in the German patent DE 30 19 347.

BACKGROUND OF THE INVENTION

Designers of beverage vendors, especially apparatuses for preparing coffee or tea by extraction, have long been of two problems for which a variety of solutions has already been offered.

The first problem is to establish a predetermined extraction period during which the extraction process takes place in the extraction chamber and during which preferably no fluid will seep through the filter into the reception chamber, followed by a quick transfer of the ready prepared extract from the extraction chamber through the filter into the reception chamber. During the extraction process the volume of water involved has to be constant to assure a manageable and reproducible extraction process. However, the moment the prepared extract has exactly the required taste and flavour, this extract has to be transferred through the filter into the reception room as quickly as possible to avoid any undesired change in taste or flavour due to a prolonged extraction process.

The second problem is maintaining the coffee or tea particles in motion within the water during the extraction process to obtain a quick, uniform homogeneous extraction. In other words, the second problem is how to achieve an agitation of the mixture of the hot water and the coffee or tea powder in the extraction chamber during the extraction period.

A type of apparatus in which a solution is offered for both problems is the apparatus comprising a piston movable in a cylindrical reception chamber. An apparatus of this type is for instance described in the Dutch patent application 68.06368, in the European patent specification EP 0 179 866 and in the British specification GB 2 178 645.

In this type of prior art apparatus the reception chamber has a cylindrical shape and comprises a piston connected through a piston rod to a crank shaft which can be driven by a motor. During the extraction period the piston is moved upwards so that air will be pressed from the reception chamber through the paper filter web of the filter unit into the extraction chamber, thereby agitating the mixture of hot water and coffee or tea powder. This agitation of the mixture has a beneficial influence on the quality of the prepared extract. Thereafter the piston is used for suctioning the prepared extract through the filter unit into the reception chamber for which purpose the piston will be moved downwards from its highest position, reached during the extraction period. As a result of the underpressure created thereby in the reception chamber, the extract will be suctioned from the extraction chamber through the filter unit into the reception chamber and can be discharged through a discharge channel opening into the reception chamber.

A first disadvantage of this prior art apparatus is its relatively complicated piston mechanism with a lot of rotatable parts, which is difficult to maintain and to clean. In particular, the fit of the piston in the cylindrical reception chamber has to be maintained within certain tolerance limits to guarantee that this prior art apparatus will function properly.

A further disadvantage is the invariability of the functioning of the apparatus. It is impossible or practically constant to have any influence on the length of the time period in which air is pressed through the mixture of water and coffee or tea powder, and the length of the suction period during which the prepared extract is suctioned through the filter unit into the reception chamber. Also, the pressure which is developed in both cases is constant or practically constant because of the inverse relation between pressure and time dictated by the use of the moving piston to create the pressure.

From the prior art, other proposals for solving the above-mentioned problems are known in which no moving piston is used but use is made of a pump. In the apparatuses described in U.S. Pat. Nos. 3,446,137 and 3,666,558 a pump is used for generating an overpressure in the extraction chamber at the end of the extraction period. This overpressure causes a quick transfer of the prepared extract from the extraction chamber through the filter into the reception chamber. This prior art type apparatus has the disadvantage that means have to be used for closing the entrances through which the hot water and the coffee or tea powder are brought in the extraction chamber in order to generate an overpressure in said extraction chamber. In addition in most cases the extraction chamber has to be movable upwards to provide space for moving parts of the filter unit to dispose the used coffee or tea powder after completion of the extraction process which may cause mechanical problems in case a pump has to be connected to the extraction chamber. Further-more, this prior art apparatus does not comprise means to agitate the mixture in the extraction chamber.

This last-mentioned disadvantage is eliminated in the apparatus described in U.S. Pat. No. 3,338,153 comprising a number of additional valves and further piping which enable the pump to be used during the extraction period for generating an overpressure in the reception chamber. This causes a steady air flow through the filter and through the mixture of water and coffee powder upwards resulting in the desired agitation of the mixture. The other above-mentioned disadvantages caused by connecting a pump to the extraction chamber are still present in this prior art apparatus. Furthermore, the extensive piping running to both the extraction chamber and to the reception chamber is considered another disadvantage of this apparatus.

A proposal to overcome the use of extensive piping and a large number of additional valves is described in WO 8.802.612. The apparatus described therein comprises one pump connected to the extraction chamber, used for suctioning air from said chamber during the extraction process such that an upward airstream through the extracting mixture is obtained and used for pressurizing the extraction chamber after the extraction period to press the extract through the filter. Although this prior art apparatus comprises means both to agitate the mixture during the extraction period and to quickly transfer the ready mixture at the end of the extraction process, if still possesses a lot of the above-mentioned disadvantages.

In the past, designers had already proposed to use a pump for generating an underpressure in the reception chamber to suction the extract through the filter paper web into the reception chamber. Examples of such apparatuses are described in GB 806.822, DE 2.043.803 and DE 3.019.347. In all these prior art apparatuses the extract is flowing through the pump. Therefore, the whole construction of the pump has to be such that contact between various parts of the pump and beverages is acceptable. This requirement restricts the choice of suitable pumps. Another problem arises from the fact that the extract is in fact not accumulated in the reception chamber but flows directly further through the discharge conduit. However, the flow velocity will be rather high, in some cases too high to deliver the extract directly into a cup. A further disadvantage of these prior art apparatuses is the lack of means for agitating the mixture in the extraction chamber.

SUMMARY OF THE INVENTION

The purpose of the present invention is to provide an apparatus which does not have the above-mentioned disadvantages of the prior art apparatuses.

These objects are fulfilled in an apparatus of the type described in the first paragraph which according to the invention is characterized in that the pump unit is double acting and is connected through suitable piping to the side wall of the reception chamber at a level above the maximum fluid level in said reception chamber a discharge valve is installed in the bottom of the reception chamber or in said discharge channel, and that the control unit is embodied such that during the extraction period the discharge valve will be closed and the pump unit will be activated during at least part of the extraction period to press air into the reception chamber causing such an overpressure that an air stream is created through the filter unit and through the mixture of water and coffee or tea powder agitating said mixture and that at the end of the extraction period, still with closed discharge valve, the action of the pump unit is reversed to suction air from the reception chamber causing such an underpressure that the prepared extract will be suctioned through the filter unit the reception chamber.

By using a double acting pump unit connected to the reception chamber the movements of the extraction chamber and the filter unit are not hindered in any way. Because the pump unit does not come into contact with the beverage a wide variety of pump units can be used. It is relatively simple to equip already existing apparatuses with such a pump unit in combination with a discharge valve in the discharge conduit.

With the control unit, the length of the time period during which a predetermined overpressure or underpressure is created can be adapted or varied in accordance with the requirements set by the user. The agitating air stream can be controlled accurately both with regard to the strength thereof and with regard to the time period in which the air stream is generated. The same applies to the suctioning of the extract. It is for instance possible to start with a relatively low underpressure for suctioning the largest part of the extract from the extraction chamber in the reception chamber, whereas near the end of the suction period the underpressure will be increased gradually to dry out the coffee powder which remains in the extraction chamber until the powder has obtained a predetermined humidity. The result thereof will be a more or less consistent cake of coffee powder which can be removed relatively easily.

In general two conduits will be necessary between the pump unit and the reception chamber, one for blowing air into the chamber and one for suctioning air from the reception chamber. To reduce the piping it is preferred that the pump unit comprises a double acting type pump connected through a suitable pressure/suction conduit to the wall of the reception chamber. By using a double acting pump only one pressure/suction conduit is necessary between the pump unit and the wall of the reception chamber.

There are different types of very cheap and very reliable single acting pumps available on the market. To be able to use such a pump within the scope of the invention an embodiment is conceivable in which the pump unit comprises a single acting pump with a pressure port and a suction port, and valve means controlled by the control unit such that during the extraction period the suction port of the pump is connected to the atmosphere and the pressure port of the pump is connected to the reception chamber and that during the following period, during which the extract will be suctioned into the reception chamber, the suction port is connected to the reception chamber and the pressure port is connected to the atmosphere.

In general it is furthermore preferred that the pump be of a type suitable for generating a variable pressure or suction, and that the control unit be adapted to control the pump to generate a required pressure or suction.

Preferably, the filter unit of the apparatus according to the invention comprises a filter paper web of the type as described in DE 30 19 347. However, the invention is not restricted to paper web filter units and can be used with comparable units in apparatuses with other type of filter unit. If a filter paper web is used in the filter unit then it is preferred that the paper filter web have a sufficient density to prevent penetration of extract through the filter paper web during the longest expected extraction period, whereby the capacity of the pump is sufficient to create such an underpressure that during a predetermined time period all the prepared extracts will be suctioned through the filter paper web. The result thereof is that the extraction period is variable within broad limits and even if a long extraction period is selected no situation will arise in which extract will seep through the filter paper web into the reception chamber. An additional advantage of the use of filter paper with a relatively high density is the fact that so-called recycling paper can be used which referring to both the costs of the paper, as well as referring to environmental protection has advantages.

BRIEF DESCRIPTION OF THE DRAWINGS

The invention will be explained in more detail with reference to the attached drawings.

FIG. 2 illustrates schematically a system according to a second embodiment of the invention.

FIG. 3 illustrates a more detailed cross-sectional view of a system according to the invention.

FIG. 4a illustrates a cross-sectional view through the valve 10 of FIG. 3.

FIG. 4b shows a bottom view according to the arrows IVb—IVb in FIG. 4a.

FIGS. 5a–5c depict a double acting valve suitable for use in a system according to the invention.

FIG. 6 depicts a preferred embodiment of a piston used in the double acting valve shown in FIGS. 5a–5c.

DETAILED DESCRIPTION OF THE INVENTION

Figure 1:
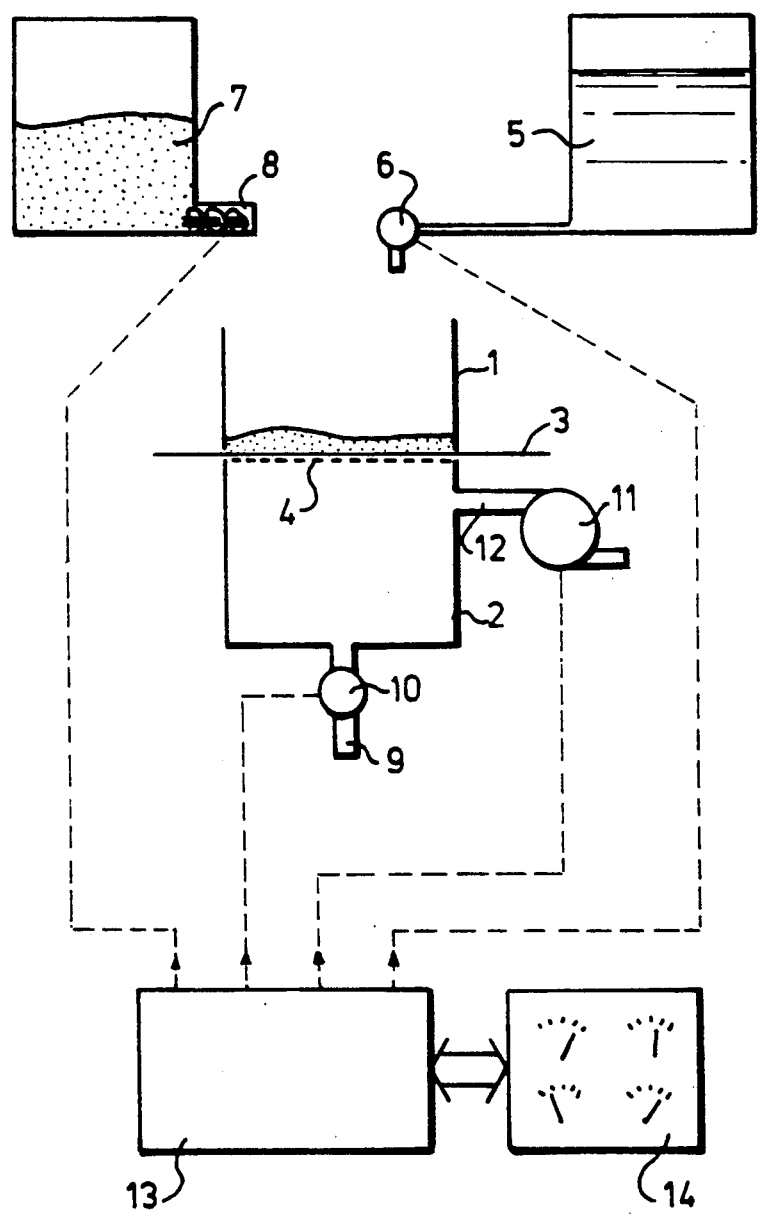
FIG. 1 illustrates schematically a system according to the invention.

The system comprises an extraction chamber 1, a reception chamber 2 underneath said extraction chamber and a filter paper web 3 positioned between both chambers. The filter paper web 3 is supported by a grid 4 positioned between the extraction chamber 1 and the reception chamber 2. A hot water reservoir 5 is installed above the extraction chamber 1 and hot water may flow through a valve 6 into the extraction chamber 1. Furthermore a supply container 7 for coffee or tea powder, part of which can be supplied into the extraction chamber 1 using a suitable mechanism such as a worm 8, is installed above the extraction chamber 1.

The reception chamber 2 comprises at the underside thereof a discharge conduit 9 in which a valve 10 is installed. Furthermore a pump unit 11 is connected through a conduit 12 to the wall of the reception chamber 2.

The system comprises furthermore a control unit 13 delivering output signals to the valve 6 for the supply of hot water to the worm 8 for supplying coffee or tea powder into the extraction chamber, to the valve 10 controlling the discharge of extract from the reception chamber 2 and the pump unit 11, the functioning of which will be explained in more detail hereinafter. The control unit 13 may contain a fixed programmed processor unit which controls the various mechanism in a predetermined manner. Preferably, however, set means 14 are present which are indicated in FIG. 1 in a very schematical way and which enable a user to set a number of time periods and a number of pressure values as will be explained in the following description.

The system illustrated in FIG. 1 functions as follows. To be able to move the filter paper web 3 such that an unused section of this filter paper web will be positioned above the grid 4 on the one hand a space is created between the underside of the extraction chamber 1 and the upperside of the reception chamber 2 respectively the grid 4 and on the other hand means are activated to move the filter paper web 3 over a predetermined distance. Thus on the one hand the coffee or tea powder used in a previous processing step will be removed and on the other hand a non-used piece of filter paper will be positioned in the right place. Means for moving the filter paper web are as such known from the state of the art and do not require further explanation. The upwards and downwards movement of for instance the extraction chamber is already described in the earlier mentioned Dutch patent application 68.06368.

After positioning a non-used section of the filter paper web 3 between the extraction chamber 1 and the reception chamber 2 the intermediate space between both chambers 1 and 2 is closed by moving the extraction chamber 1 downwards until both chambers are pressed against each other clamping the filter paper web in between. The filter paper web 3 is additionally supported by a grid 4 which does not have a filter function. Thereafter by means of a suitable control signal from the control unit 13 a start signal is supplied to the worm mechanism, which worm mechanism is activated during a predetermined period to supply a corresponding predetermined amount of coffee or tea powder from the reservoir 7 into the extraction chamber 1. Simultaneously or with some delay a control signal is supplied by the control unit 13 to the valve 6, which will be opened during a predetermined period to supply a corresponding predetermined amount of hot water from the reservoir 5 into the extraction chamber 1. It will be clear that instead of the hot water reservoir 5 with a valve 6 connected thereto, other means can be used for supplying a predetermined amount of hot water into the extraction chamber 1. Such means are known to the expert in this field and do not require any further explanation.

As soon as both the coffee or tea powder and the hot water are supplied into the extraction chamber 1, the actual extraction period begins in which the mixture of powder and water will form an extract. The total extraction period is preferably selected such that an extract of the desired strength and quality will be obtained. It will be clear that the length of this period will be dependent on the total amount of powder and water which are supplied into the extraction chamber 1 and will furthermore dependent on the qualities of the coffee or tea powder employed.

At the end of the extraction period, which period will be determined by the control unit 13 with help of a timer present in this unit, a signal is supplied to the pump unit 11 which will be activated suctioning thereby air from the reception chamber 2. The result thereof is the creation of an underpressure in the reception chamber 2 of a sufficient value to suction the extract which is present above the filter paper web 3 in the extraction chamber 1 through said filter paper web in the reception chamber 2. The pump unit 11 sunctioning air through the conduit 12 from the reception chamber 2 will be activated for a sufficiently long time and with a sufficient underpressure to suction all the extract from the extraction chamber 1 into the reception chamber 2. Preferably, the suction period will be dimensioned such that the remaining coffee powder, which stays as a kind of consistent cake onto the filter paper web 3 will reach a sufficient dryness, such that at the end of the preparation process this powder can be removed very easily.

At the end of the suction period the pump unit 11 is stopped and simultaneously or with a short delay the control unit 13 opens the valve 10 so that the extract, present in the reception chamber 2, can be discharged through the discharge conduit 9 to for instance a jug, cup or something similar.

The embodiment of the whole system is rather simple and therefore easy to clean and to maintain. Furthermore the system comprises, besides the valves 6 and 10, the worm mechanism 8 and the pump unit 11 little or no moving parts so that there is little chance of malfunctioning.

Using the set means 14 the user is able to adapt the length of the extraction period, the length of the suction period and eventually the pressure generated by the pump unit 11, or in other words the value of the underpressure created in the reception chamber 2. The larger the underpressure, the faster the extract will be suctioned from the extraction chamber 1 into the reception chamber 2 and the dryer the coffee powder which will remain onto the filter paper web 3. If the pump unit is able to generate a variable underpressure it is also possible with a suitable control of the control unit 13 to switch the pump unit 11 initially to a relatively low activity level such that a relatively low but sufficient underpressure is created to suction extract from the extraction chamber 1. Thereafter, near the end of the suction period, the pump unit is switched to its maximum so that during a very short time the remaining coffee powder is suctioned "dry".

In a preferred embodiment of the system according to the invention the pump unit is not only used to suction extract during the suction period from chamber 1 into chamber 2, but is used also to blow air in the reception chamber 2 during the extraction period with the result that, because of the generated overpressure, air will be pressed upwards through the filter paper web 3 and through the mixture of water and coffee or tea powder. As a result thereof the mixture will be strongly agitated which is beneficial to the extraction.

In many cases the pump unit 11 can be embodied as a double acting pump. In such a case, it will be sufficient for the unit 13 to deliver a suitable control signal at least during a part of the extraction period to the pump unit 11 so that the pump unit 11 will start functioning as a blowing device blowing air through the conduit 12 into the reception chamber 2. At the end of the extraction period, and respectively at the beginning of the suction period again, the unit 13 supplies a suitable signal to the pump unit 11 such that the moving parts of this pump unit 11 will start rotating in the reverse direction causing the pump to suction air through conduit 12 from the reception chamber 2 to achieve the effect described above.

If for one reason or another an irreversible pump has to be used which is only able to function in one manner, then even in such a case this pump can be used for blowing air as is indicated in the example illustrated in FIG. 2. The differences between the embodiments illustrated in FIGS. 1 and 2 are found in the region around the pump unit 11. In the embodiment of FIG. 2 the pump unit 11 is with its suction port through the suction channel 12 connected to the reception chamber 2 whereby the channel 12 comprises a three way valve 15 by means of which the suction port of the pump unit 11 can be connected either to the suction channel 12 or to another free channel 16 giving access to the atmosphere. The pressure port of the pump unit 11 is through a channel 17 connected to the reception chamber 2 whereby a three way valve 18 is installed within said channel 17 which can be switched such that the pressure port of the pump unit 11 is connected either to the channel 17 or to another channel 19 giving access to the atmosphere.

If during the suction period the pump unit 11 has to be used for suctioning an extract from the chamber 1 into the chamber 2, then a control signal is supplied to the valve 16 such that the suction port of the pump unit 11 comes into connection with the channel 12 whereas simultaneously the valve 18 receives a signal such that the pressure port of the pump unit 11 is through valve 18 connected to the channel 19 and through channel 19 with the atmosphere. Thereafter, the pump unit 11 is activated and will function as suction pump. If during the extraction period the pump unit 11 should be used also as pressure pump then the valve 15 will be controlled by the control unit 13 such that the suction port of the pump unit 11 is through valve 15 and channel 16 connected with the atmosphere whereas the valve 18 will be controlled by the control unit 13 such that the pressure port of the pump unit 11 is through the valve 18 and the channel 17 connected to the reception chamber 2.

It will be clear that in the embodiment of FIG. 2 the control unit 13 will be embodied differently or will be programmed in a different manner such that the unit is able to supply the suitable control signals to the various components. The realization of a control unit for both the embodiment of FIG. 1 and the embodiment of FIG. 2 on the basis of the above described functioning is considered within the scope of an expert in this field and a further detailed description of the control unit is considered therefore superfluous.

FIG. 3 illustrates a more detailed cross-sectional view of a system according to the invention, especially illustrating the extraction chamber 1, the filter unit 3, 4 and the reception chamber 2 with the discharge channel 10. In this embodiment the grid 4 is provided in an integral manner as a suitable pattern of openings in a profiled plate 21 forming part of the frame of the system which is not further illustrated. Around the grid 4 a recess is made in the upper surface of the plate 21 in which preferably a ring 23 of a somewhat flexible compressible material is installed. The shape of the lower edge of the extraction chamber 1 is selected such that this edge will fit in the recess 22 and with help of not illustrated means can be moved downwards until the ring 23 is somewhat compressed and therefore a suitable closure between the chamber 1 and the ring 23 respectively the plate 21 is obtained. Before the chamber 1 is moved downwards until it comes in contact with the ring 23 a non-used section of the filter paper web 3 is positioned above the grid 4. As is schematically indicated in FIG. 3 this filter paper web 3 will become clamped between the lower ring of the chamber 1 and the flexible closure ring 23 because of the downwards movement of the chamber 1.

The chamber 2 is positioned underneath the plate 21 in such a manner that the upper edge of the chamber 2 is sealed against the plate 21. Details of this sealing are not provided in the figure but are considered as known to the expect in this field. At the lower end of the reception chamber 2 a valve 10 is installed, details of which will be explained with reference to FIG. 4.

A downwards directed rim 20 extends from the under surface of the plate 22 around the grid 4 and is inserted in the chamber 2. Preferably the discharge conduit 12 is installed in the wall of the chamber 2 such that the opening thereof is positioned above the level of the under edge of the downwards extending rim 20. h In this manner, the chance of suctioning extract through the suctioning conduit 12 is eliminated. Thanks to the rim 20 it is furthermore assured that the extract, suctioned from the chamber 1 through the filter paper web 3 and through the grid 4 only comes in contact with a small wall surface, more specially the inner wall of the rim 20, and falls from there downwards in the lower section of the reception chamber 2. Because of this construction the extract will only show a minor temperature variation as result of contact with the chamber wall.

After transferring the extract from the chamber 1 into the chamber 2 by suctioning air from the chamber 2 the valve 10 is opened to discharge the extract to a jug, a cup or the like. The operation of this valve will be discussed in detail with reference to FIG. 4.

FIG. 4a illustrates a cross-sectional view through the valve 10, whereas FIG. 4b shows a bottom view according to the arrows IVb—IVb in FIG. 4a.

The valve 10 comprises a valve body 24 which is essentially embodied as a hollow cylinder. The upper end of this hollow cylindrical body comprises a cover plate 24a. Directly underneath this cover plate 24a there is a section 24b with smaller diameter than the diameter of the rest of the cylindrical body. This section 24b has one or more bores running through the internal hollow part of the valve body 24. One of these bores is indicated by 24c in FIG. 4a.

The valve body 24 cooperates with a flexible ring 25 installed within a suitable excavation 26 in the bottom wall of the chamber 2. It will be clear from the figure that, when the valve body is moved downwards, the upper section 24a will be pressed against said ring 25. forming a seal therewith. Furthermore the valve body 24 cooperates with an O-ring 27 installed in a suitable recess 28. It will be clear from the figure that this O-ring functions to prevent the escape of fluid along the valve body 24 out of the chamber 2 in another way than the way which will be described hereinafter.

A pin 30 is connected to the lower end of the valve body 24 the underside of this pin 30 is in contact with cam disc 31 mounted on a shaft 32. This shaft is driven by a motor. It will be clear that depending on the position of the cam disc 31 the valve will be opened or closed. In FIG. 4a the opened position is illustrated. In this position fluid may flow from the chamber 2 through the recess 24b and the bores 24c through the hollow valve body 24 downwards and will be received in a chamber 33 in a guide element 34. From this chamber a bore runs to a connection stub 35 designed to be coupled with for instance a hose or a conduit. This stub is visible in FIG. 4b. In the opened condition fluid (coffee or tea extract) can be discharged through the chambers 33 and the stub 35 to its ultimate destination.

If the valve is closed by turning the cam disc 31 then the bottom wall of the chamber 2 will be sealed, because the end plate 24 forms a seal together with the O-ring 25.

The hollow body 24 preferably comprises a flat side wall section eventually comprising a rib 36 as is illustrated in FIG. 4b. The purpose thereof is to prevent a rotation of the body 24 around it own axes.

Although in the embodiment of FIG. 2 separate valves 15 and 18 are used to connect the pump via two separate channels 12 and 17 to the reception chamber 2 it is also possible to use a double acting valve with only one channel as connection between the reception chamber 2 and the pump unit 11. Such a double acting valve, suitable for this purpose, is illustrated in the FIGS. 5A ... 5C. The valve comprises a housing 40 with a first stub 41 to which the suction side of the pump can be connected, a second stub 42 to which the pressure side of the pump can be connected and a third stub 43 to which the one conduit to the reception chamber will be connected. In the cylindrically shaped housing 40 three pistons 44, 45 and 46 are installed each attached to a piston rod 47. The upper section of the piston rod is biased because of a spring 48 positioned within the chamber 40 between the upper piston 46 and the upper wall of the chamber 40. The upper wall of the chamber 40 is in the illustrated manner provided with an opening through which the upper end of the piston rod 47 moves. The upper section of the piston rod 47 comprises a through going bore ending in the side wall of the piston rod between the pistons 45 and 46. The piston rod will be moved upwards and downwards using an eccentric 48 connected to a shaft 49.

In FIG. 5A the excentric is through a suitable rotation of the shaft 49 brought in such a position that the piston rod 47 has reached its most downwards position. In this position the pistons 44, 45 and 46 are positioned in the illustrated manner within the chamber 40 such that a fluid connection is established between the stub 42 and the stub 43 whereby no fluid connection exists between the stub 41 and the channel 50 through the upper section of the piston rod 47. It will be clear that the pump, which is not illustrated in the figure, is able to suction air through the channel 50 whereby air is supplied through the stubs 42 and 43 to the (not illustrated) reception chamber. The direction of the air movement is illustrated by means of arrows in FIG. 5A.

In FIG. 5B the eccentric 48 is through a suitable rotation of the shaft 49 brought in such a position that the piston rod 47 has reached its highest position. In this position there is a fluid connection between the stubs 41 and 43 so that the pump is able to suction air through this connection from the (not illustrated) reception chamber. The air supplied by the pump flows through the stub 42 and the open under end of the chamber 40 to the atmosphere. Also in FIG. 5B the direction of movement of the air is indicated by means of arrows.

In FIG. 5C the possibility is illustrated to control the pressure during the suctioning or blowing of the pump by means of the position of the combination valve. In FIG. 5C the eccentric 48 is by means of the rotation shaft 49 brought in a position whereby the pistons 44, 45 and 46 are positioned such that the pump supplies air to the reception chamber but specially the piston 44 positioned partly within the fluid flow path, so that the pressure of the air supplied to the reception chamber is somewhat decreased. By selecting a suitable higher or lower position of the piston rod 47 the air pressure can be varied in a continuous manner.

It is preferred that the shaft 49 be coupled to the shaft 32 of the valve 10 illustrated in the FIGS. 4A and 4B. Especially it is preferred to use one single shaft onto which both the eccentric 31 and the eccentric 48 are attached. By rotating this one single shaft by means of a motor the cyclic operation of the coffee preparing system can be controlled in a simple manner.

Although in the FIGS. 5a ... 5c the pistons 44, 45 and 46 are embodied as smooth bodies it is preferred to provide each of the pistons with a groove in which an O-ring is installed in the way as illustrated in FIG. 6. In this figure the piston 45 is shown as an example. The piston comprises a groove in which an O-ring 50 is installed. This O-ring 50 assures a proper sealing between the piston and the wall of the chamber 40. The use of O-rings for such purposes is considered as known to the expert in this field.

Finally, it is remarked that in the embodiment of FIG. 5 three pistons 44, 45 and 46 are used, however, in principle only two pistons are sufficient to obtain a correct functioning of the valve. If the piston 46 is deleted and openings are made in the wall of the chamber 40 such that in the situation illustrated in FIG. 5A air can be suctioned through said openings and through the stub 41 than the operation of such a valve is completely identical to the operation described with reference to the FIGS. 5A . . . 5C. From a constructive standpoint such a solution is however, less favourable.

I claim:

1. In an apparatus for preparing beverages such as coffee or tea, comprising:
    a filter unit including a filter paper web,
    an extraction chamber having a bottom wall and being positioned above said filter unit, said bottom wall being at least partly permeable, and adapted to be pressed against the filter unit,
    a reception chamber having an upper wall, a bottom part and being positioned underneath the filter unit, said upper wall being at least partly permeable and positioned in contact with the filter unit, said reception chamber including at its bottom part a discharge channel for discharging a prepared beverage,
    supply means for supplying coffee or tea powder and hot water in the extraction chamber to prepare an extract during a predetermined extraction period,
    a pump unit connected to the reception chamber by a conduit to suck the prepared extract through the filter unit in the reception chamber,
    a control unit for controlling the supply means, the pump unit and the discharge channel such that after activating said means for supplying predetermined amounts of hot water in coffee or tea powder in the extraction chamber, an extraction period is measured during which the extraction process is completed, after which the pump unit is activated to suction the prepared extract through the filter paper web, the improvement wherein the pump unit is connected through suitable piping to a side wall of the reception chamber at a level above a maximum fluid level in said reception chamber, a discharge valve is provided in the bottom part of the reception chamber or in said discharge channel, and the control unit is embodied such that during the extraction period the discharge valve is closed and the pump unit is activated during at least part of the extraction period to press air at a predetermined rate into the reception chamber causing such an overpressure that an air stream is created through the filter unit and through the mixture of water and coffee or tea powder, thereby agitating said mixture, and that at the end of the extraction period, still with the discharge valve being closed, the action of the pump unit is reversed to suction air at a predetermined rate from the reception chamber causing such an underpressure that the prepared extract will be suctioned through the filter unit into the reception chamber.

2. Apparatus according to claim 1, wherein the pump unit comprises a double acting type pump fluidly connected through a suitable pressure/suction conduit to the side wall of the reception chamber.

3. Apparatus according to claim 2, wherein the pump is of a type suitable for generating a variable pressure or suction and that the control unit is adapted to control the pump to generate a required pressure or suction.

4. Apparatus according to claim 1, wherein the pump unit comprises a single acting pump with a pressure port and a suction port, and valve means controlled by the control unit such that during the extraction period the suction port of the pump is connected to the atmosphere and the pressure port of the pump is connected to the reception chamber, and that during the following period, during which the extract is suctioned into the reception chamber, the suction port is connected to the reception chamber and the pressure port is connected to the atmosphere.

5. Apparatus according to claim 4, wherein the pump is of a type suitable for generating a variable pressure or suction and that the control unit is adapted to control the pump to generate a required pressure or suction.

6. Apparatus according to claim 1, wherein the filter paper web has a sufficient density to prevent penetration of extract therethrough, and the capacity of the pump unit is sufficient to create said underpressure so that during a predetermined time period all prepared extracts are suctioned through the filter paper web.

* * * * *